US012717413B2

(12) United States Patent
Cho et al.

(10) Patent No.: US 12,717,413 B2
(45) Date of Patent: Aug. 25, 2026

(54) ELECTRONIC DEVICE COMPRISING KEY FOR SUPPORTING HAPTIC REACTION

(71) Applicant: SAMSUNG ELECTRONICS CO., LTD., Suwon-si (KR)

(72) Inventors: Hyunje Cho, Suwon-si (KR); Il Kim, Suwon-si (KR); Jongheon Kim, Suwon-si (KR); Hyunwoo Kim, Suwon-si (KR); Kichul Namgung, Suwon-si (KR); Mijeong Song, Suwon-si (KR); Jiwoo Lee, Suwon-si (JP); Gun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/653,033

(22) Filed: May 2, 2024

(65) Prior Publication Data

US 2024/0281069 A1 Aug. 22, 2024

Related U.S. Application Data

(63) Continuation of application No. PCT/KR2022/013571, filed on Sep. 8, 2022.

(30) Foreign Application Priority Data

Nov. 12, 2021 (KR) ........................ 10-2021-0155735

(51) Int. Cl.

| | |
|---|---|
| ***G06F 3/01*** | (2006.01) |
| ***G06F 3/02*** | (2006.01) |
| ***G06F 3/023*** | (2006.01) |

(52) U.S. Cl.
CPC ............ *G06F 3/016* (2013.01); *G06F 3/0202* (2013.01); *G06F 3/023* (2013.01)

(58) Field of Classification Search
None
See application file for complete search history.

(56) References Cited

U.S. PATENT DOCUMENTS

| | | | | |
|---|---|---|---|---|
| 6,455,795 B1 * | 9/2002 | Murakami | ............. | H01H 13/14 200/345 |
| 11,334,168 B1 * | 5/2022 | Hrehor | .................... | G06F 3/016 |

(Continued)

FOREIGN PATENT DOCUMENTS

| | | |
|---|---|---|
| CN | 101488046 A | 7/2009 |
| JP | 2001249758 A | 9/2001 |

(Continued)

OTHER PUBLICATIONS

International Search Report for PCT/KR2022/013571 mailed Dec. 28, 2022, 5 pages.

(Continued)

*Primary Examiner* — Benjamin C Lee
*Assistant Examiner* — Sarvesh J Nadkarni
(74) *Attorney, Agent, or Firm* — Nixon & Vanderhye P.C.

(57) ABSTRACT

An electronic may include: a housing; a plurality of keys positioned in the housing and each including a key cap configured to move along a stroke direction during a stroke; a first haptic actuator configured to generate vibration during a stroke of at least one key among the plurality of keys; and a haptic plate configured to vibrate by the first haptic actuator and configured to vibrate a key cap of at least one stroked key among the plurality of keys.

18 Claims, 18 Drawing Sheets

(56) References Cited

U.S. PATENT DOCUMENTS

| | | | | |
|---|---|---|---|---|
| 11,394,385 | B1 * | 7/2022 | Wang | G06F 3/0202 |
| 2009/0167694 | A1 * | 7/2009 | Tan | G06F 3/04886 340/407.2 |
| 2010/0052880 | A1 | 3/2010 | Laitinen | |
| 2010/0089735 | A1 | 4/2010 | Takeda | |
| 2010/0205803 | A1 * | 8/2010 | Lipton | H10N 30/85 29/825 |
| 2011/0102326 | A1 | 5/2011 | Casparian et al. | |
| 2011/0227763 | A1 * | 9/2011 | Schlosser | G06F 3/0202 341/27 |
| 2012/0092263 | A1 * | 4/2012 | Peterson | G06F 3/0443 345/168 |
| 2012/0268384 | A1 * | 10/2012 | Peterson | H01H 13/85 345/173 |
| 2012/0299832 | A1 * | 11/2012 | Peterson | G06F 3/0202 345/168 |
| 2013/0093679 | A1 | 4/2013 | Dickinson et al. | |
| 2014/0218303 | A1 * | 8/2014 | Kao | G06F 3/0219 345/168 |
| 2014/0340208 | A1 * | 11/2014 | Tan | H01H 57/00 340/407.2 |
| 2015/0034470 | A1 * | 2/2015 | Kimura | H01H 13/84 200/5 A |
| 2017/0169967 | A1 * | 6/2017 | Chen | H03K 17/968 |
| 2018/0217669 | A1 * | 8/2018 | Ligtenberg | H01H 13/785 |
| 2021/0240270 | A1 * | 8/2021 | Knoppert | H01H 13/85 |
| 2022/0176241 | A1 * | 6/2022 | Goh | A63F 13/98 |

FOREIGN PATENT DOCUMENTS

| | | | |
|---|---|---|---|
| JP | 6100355 | B1 | 3/2017 |
| JP | 2017111574 | A | 6/2017 |
| KR | 2010-0136983 | A | 12/2010 |
| KR | 20160009032 | A | 1/2016 |
| KR | 20160090647 | A | 8/2016 |
| WO | WO 2019/162708 | A | 8/2019 |

OTHER PUBLICATIONS

Written Opinion of the ISA for PCT/KR2022/013571 mailed Dec. 28, 2022, 6 pages.

Extended European Search Report dated Jan. 14, 2025 for EP Application No. 22893000.4.

Korean Office Action dated Feb. 20, 2026 for KR Application No. 10-2021-0155735.

* cited by examiner

ELECTRONIC DEVICE COMPRISING KEY FOR SUPPORTING HAPTIC REACTION

CROSS-REFERENCE TO RELATED APPLICATIONS

This application is a continuation application of International Application No. PCT/KR2022/013571 designating the United States, filed on Sep. 8, 2022, in the Korean Intellectual Property Receiving Office and claiming priority to Korean Patent Application No. 10-2021-0155735, filed on Nov. 12, 2021, in the Korean Intellectual Property Office, the disclosures of which are all hereby incorporated by reference herein in their entireties.

BACKGROUND

Technical Field

Certain example embodiments relate to an electronic device typically including a key, and for example, an electronic device including a key that provides a user with a haptic reaction according to a key stroke.

Description of Related Art

A method of providing various feedback to a user in a computer application has been developed. For example, auditory feedback may be provided to a user through a display and/or a speaker or vibration feedback may be provided through a joystick or a controller.

SUMMARY

According to an example embodiment, an electronic device may include a housing, a plurality of keys disposed in the housing and respectively including key caps configured to move in a stroke direction P during a stroke, a first haptic actuator configured to generate vibration when at least one of the plurality of keys is stroked, and a haptic plate configured to be vibrated by the first haptic actuator and configured to vibrate the key cap of at least one stroked key of the plurality of keys.

According to an example embodiment, an electronic device may include a housing, a plurality of keys disposed in the housing, a first haptic actuator configured to generate vibration when at least one of the plurality of keys is stroked, a haptic plate configured to be vibrated by the first haptic actuator and configured to vibrate a stroked key among the plurality of keys, and a processor configured to drive the first haptic actuator when at least one of the plurality of keys is stroked.

According to an example embodiment, an electronic device may include a housing, a plurality of keys disposed in the housing, a first haptic actuator configured to generate vibration at a first stroke depth of at least one of the plurality of keys, and a haptic plate configured to be vibrated by the first haptic actuator and configured to vibrate a stroked key among the plurality of keys at a second stroke depth that is greater than the first stroke depth of the at least one of the plurality of keys.

BRIEF DESCRIPTION OF DRAWINGS

The foregoing and other aspects, features, and advantages of embodiments in the disclosure will become apparent from the following detailed description with reference to the accompanying drawings.

DETAILED DESCRIPTION

Figure 1:
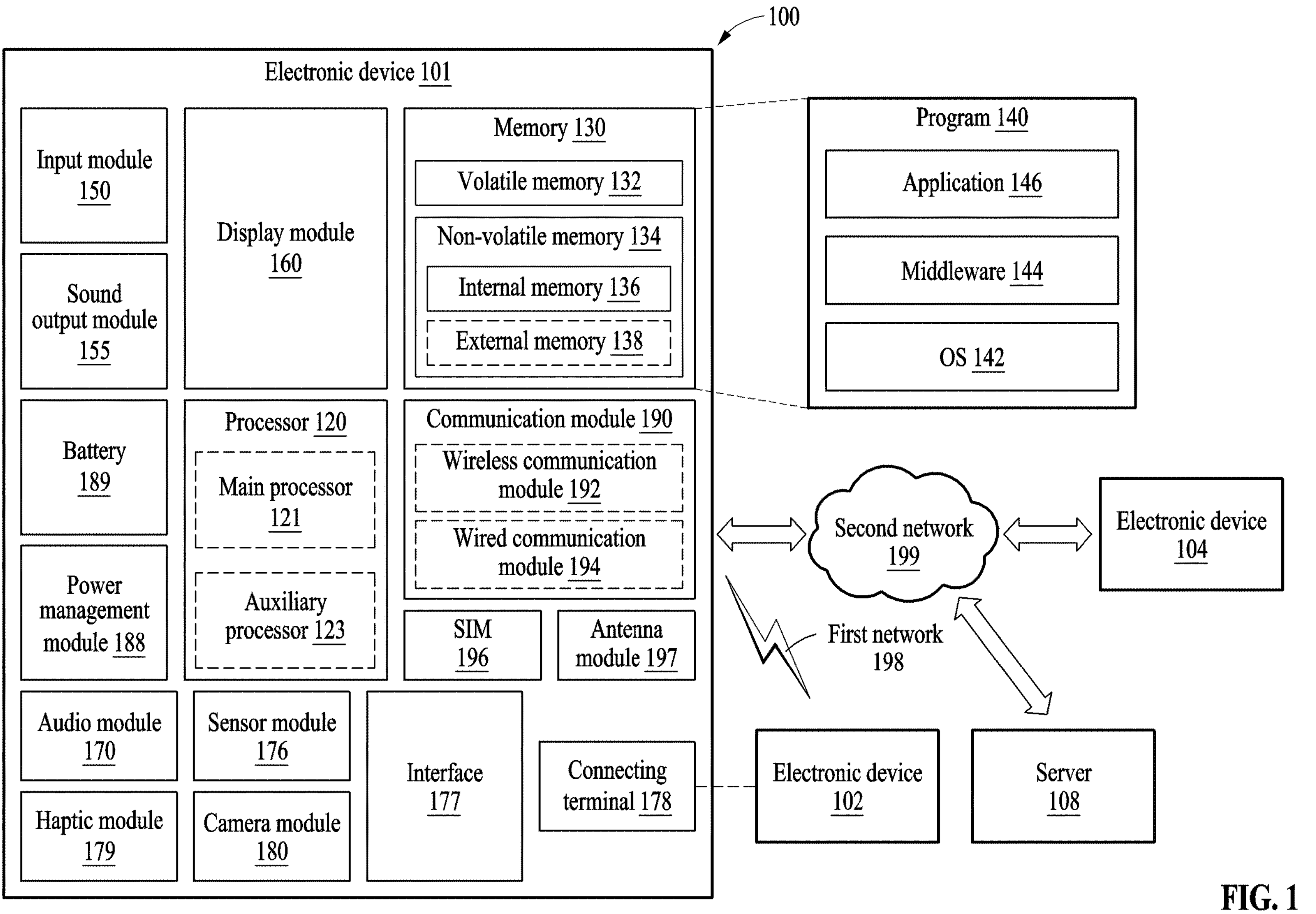
FIG. 1 is a block diagram of an electronic device in a network environment according to an example embodiment.

FIG. 1 is a block diagram of an electronic device in a network environment according to an example embodiment.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected, directly or indirectly, to the processor 120, and may perform various data processing or computation. According to an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure. Each "processor" herein includes processing circuitry, and/or may include multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that various embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "1st," "2nd," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Embodiments of the disclosure as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, according to embodiments, the integrated component may still perform one or more functions of each of the plurality of components in the same manner or in a similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 2:
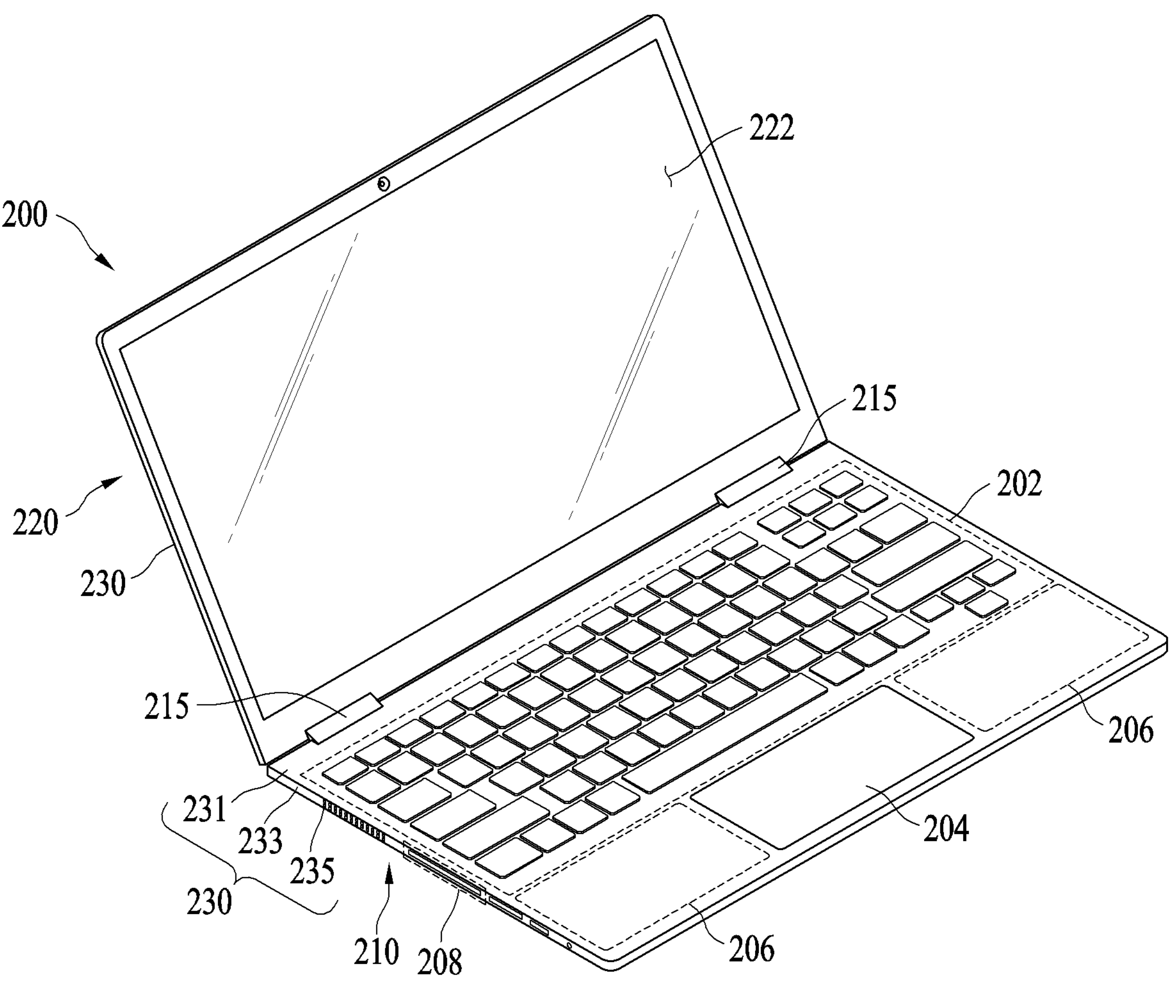
FIG. 2 is a perspective view of an electronic device according to an example embodiment.

FIG. 2 is a perspective view of an electronic device according to an example embodiment.

Referring to FIG. 2, an electronic device 200 (e.g., the electronic device 101 of FIG. 1) may include a first housing 210, a connector 215, a display 220 (e.g., the display module 160 of FIG. 1), and a second housing 230. The electronic device 200 may include, for example, a smartphone, a laptop computer, a tablet personal computer (PC), an e-book reader, a portable multimedia device, a portable medical device, a wearable device, or a home appliance.

The first housing 210 may include a keyboard 202, a touchpad 204, a palm rest 206, and an antenna module 208. The keyboard 202 (e.g., the input device 150 of FIG. 1) may include a plurality of keys on an upper portion of the first housing 210. The keyboard 202 may receive numeric or character information. The keyboard 202 may include a plurality of input keys and function keys for setting various functions of the electronic device 200. The function keys may include an arrow key, a volume key, and/or a shortcut key set to perform a designated function. The keyboard 202 may include one of a query keypad, a 3*4 keypad, a 4*3 keypad, or a touch key. The touchpad 204 may replace a function of a mouse. The touchpad 204 may input a command to select or execute an application displayed on the display 220. The palm rest 206 may be a pedestal for reducing wrist fatigue of a user of the electronic device 200 when the user is using the keyboard 202. The antenna module 208 (e.g., the antenna module 197 of FIG. 1) may transmit or receive a signal or power to or from an external electronic device (e.g., the electronic device 102 and 104, and/or the server 108 of FIG. 1).

The connector 215 may foldably or unfoldably couple the first housing 210 to the display 220. The connector 215 may mechanically connect the first housing 210 and the display 220. The connector 215 may include, for example, a hinge member between the first housing 210 and the display 220. The connector 215 may electrically connect the first housing 210 and the display 220. The connector 215 may include, for example, a flexible printed circuit board (FPCB) between the first housing 210 and the display 220.

The display 220 may include a screen 222. The screen 222 may display information input by the user and information to be provided to the user using various menus and the keyboard 202 of the electronic device 200. The screen 222 may be formed of at least one of a liquid crystal display (LCD), an organic light-emitting diode (OLED), an active-matrix organic light-emitting diode (AMOLED), a flexible display, or a transparent display. The screen 222 may provide at least one of various screens, such as a home screen, a menu screen, a lock screen, a game screen, a webpage screen, a call screen, or a music or video playback screen according to use of the portable electronic device 200.

The second housing 230 may form an exterior of the first housing 210. The second housing 230 may also be applied to the palm rest 206 positioned in the first housing 210. The second housing 230 may protect at least one electronic component (e.g., the processor 120, the memory 130, the sensor module 176 of FIG. 1, and other electronic components) included in the first housing 210. The second housing 230 may include a first surface 231 covering the upper surface, a second surface 233 covering a side surface, and a third surface 235 covering a rear surface of the first housing 210. The second housing 230 may form an exterior of the display 220. The second housing 230 may protect at least one of various electronic components (e.g., the camera module 180, the sound output device 155 of FIG. 1, and other electronic components) and the screen 222 included in the display 220.

Meanwhile, unlike the embodiment shown in FIG. 2, the electronic device 200 may include the keyboard 202 without the display 220 and may be configured to communicate with another electronic device (e.g., the electronic device 102 and/or the electronic device 104 of FIG. 1).

Figure 3A:
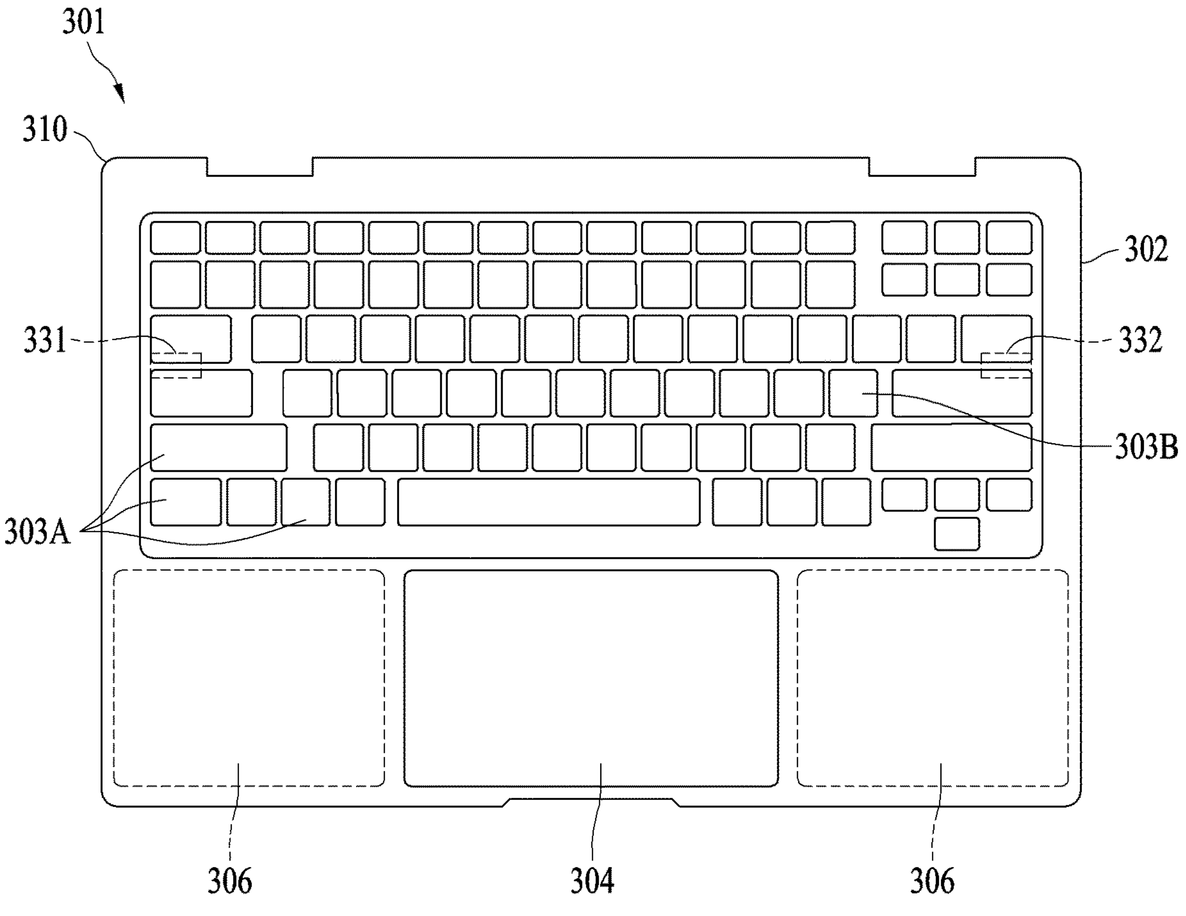
FIG. 3A is a plan view of an electronic device according to an example embodiment.
Figure 3A:
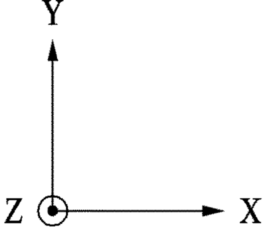
Figure 3B:
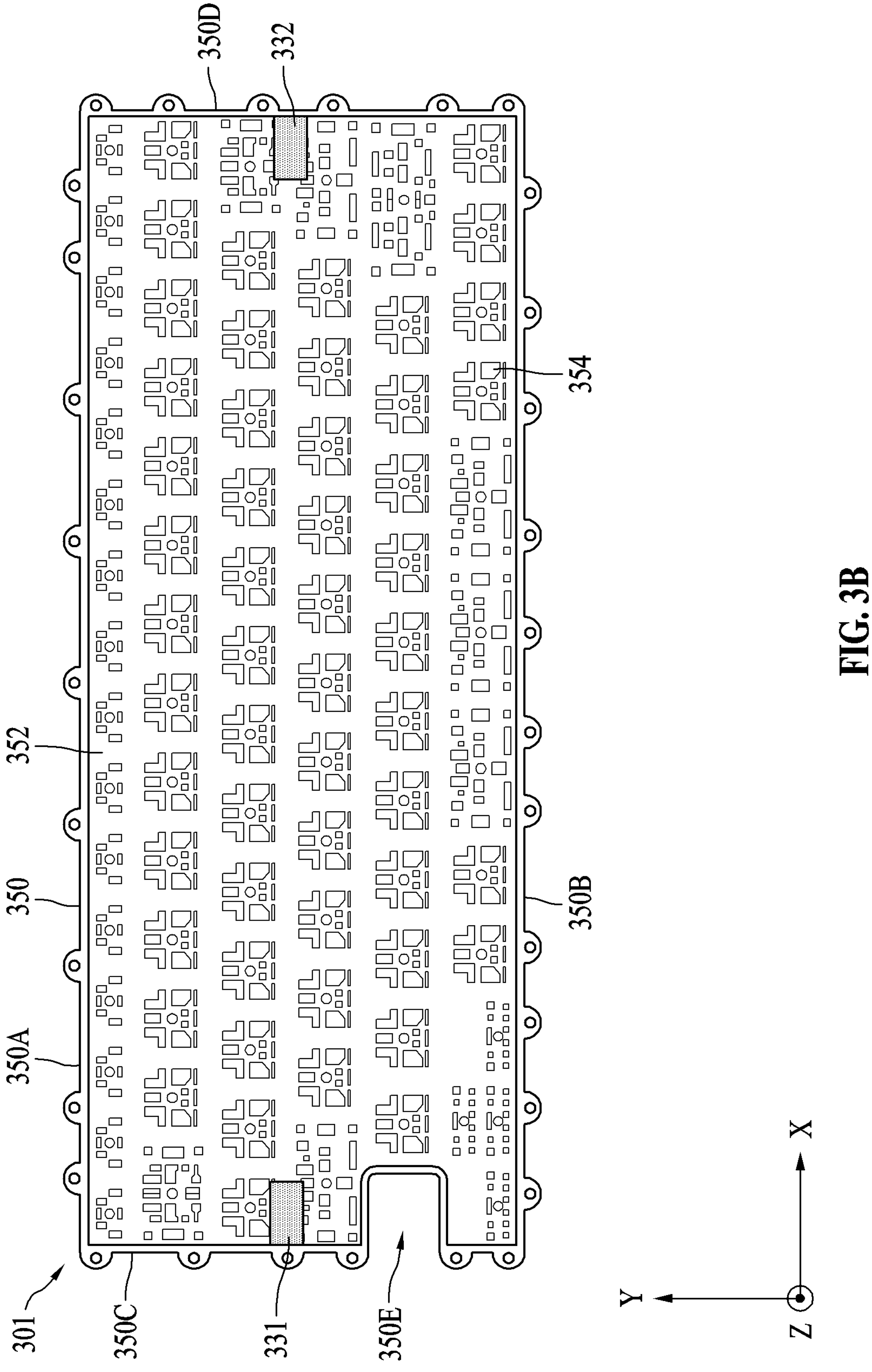
FIG. 3B is a plan view of a printed circuit board (PCB) in an electronic device according to an example embodiment.
Figure 3C:
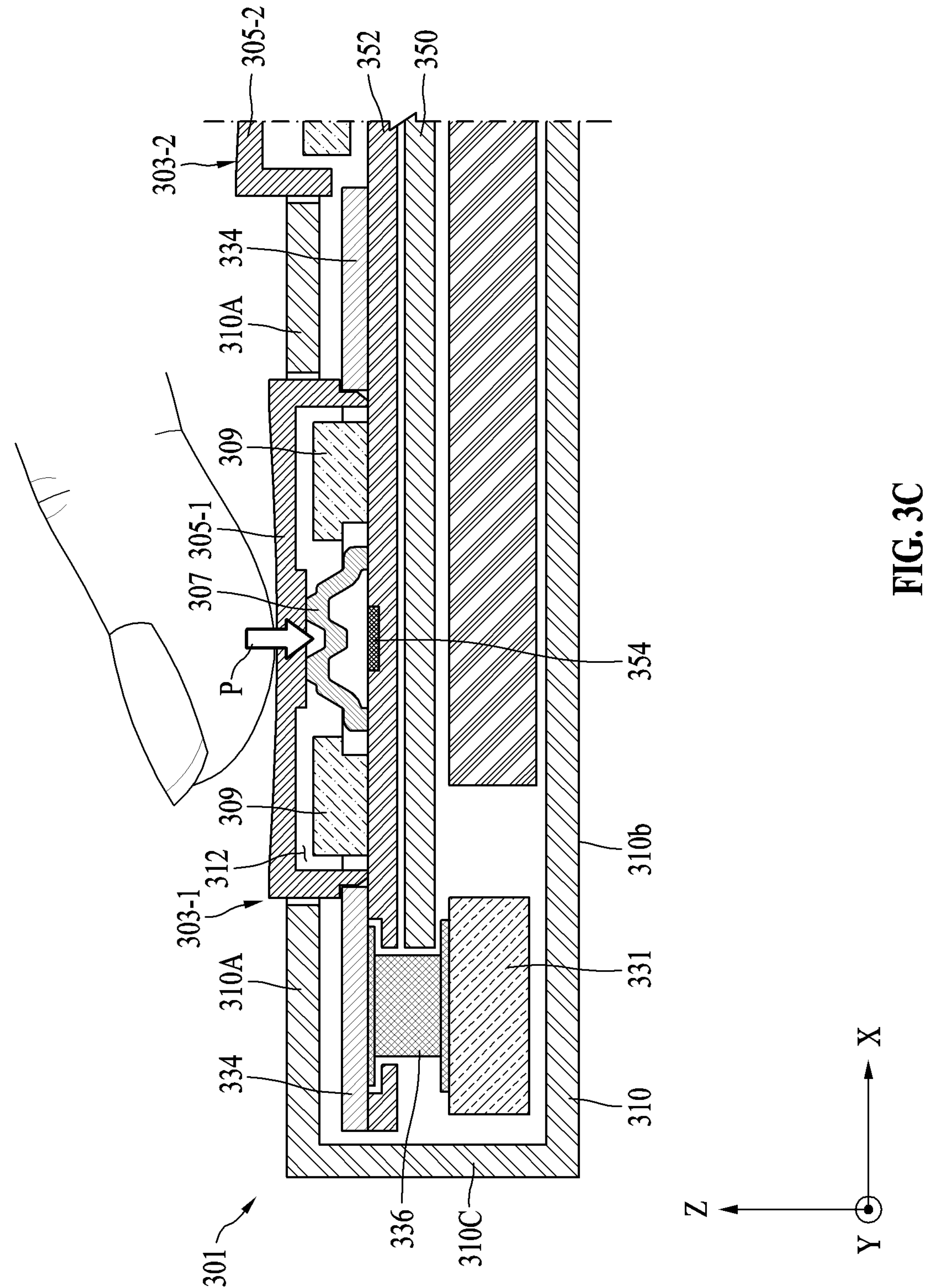
FIG. 3C is a diagram illustrating a cross-section of an electronic device according to an example embodiment.

FIG. 3A is a plan view of an electronic device according to an example embodiment. FIG. 3B is a plan view of a printed circuit board (PCB) in an electronic device according to an example embodiment. FIG. 3C is a diagram illustrating a cross-section of an electronic device according to an example embodiment.

Referring to FIGS. 3A to 3C, an electronic device 301 (e.g., the electronic device 201 of FIG. 2) in an example embodiment may include a housing 310 (e.g., the first housing 210). The housing 310 may include a keyboard 302 (e.g., the keyboard 202), a touchpad 304 (e.g., the touchpad 204), and a palm rest 306 (e.g., the palm rest 206).

The keyboard 302 may include a plurality of keys 303-1 and 303-2. The plurality of keys 303-1 and 303-2 may include a plurality of first keys 303A of a first type and a plurality of second keys 303B of a second type. The first keys 303A may include, for example, a ctrl key, an alt key, a shift key, and other function keys. The second keys 303B may include, for example, a plurality of number keys and/or letter keys.

The plurality of keys 303-1 and 303-2 may respectively include key caps 305-1 and 305-2, a switch 307, and an elastic body 309.

The key caps 305-1 and 305-2 may be configured to move in a stroke direction P (e.g., a downward direction in FIG. 3C) during a stroke and when releasing the stroke, may be configured to move in a direction (e.g., an upward direction in FIG. 3C) opposite to the stroke direction P.

The switch 307 may be elastically transformed while contacting the key caps 305-1 and 305-2 when the key caps 305-1 and 305-2 are stroked. The switch 307 may be disposed on a board plate 352. In an example embodiment, the switch 307 may be formed of a rubber material. In an example embodiment, the switch 307 may have a dome shape.

The elastic body 309 may be configured to restore the key caps 305-1 and 305-2 in the direction opposite to the stroke direction P while contacting the key caps 305-1 and 305-2 when the strokes of the key caps 305-1 and 305-2 are released. The elastic body 309 may be disposed on the board plate 352. In an example embodiment, the elastic body 309 may have a scissor structure including a configuration transforming depending on a stroke depth.

The housing 310 may include a first surface 310A (e.g., a top surface of FIG. 3C), a second surface 310B (e.g., a bottom surface) opposite to the first surface 310A, a third surface or a side surface 310C between the first surface 310A and the second surface 310B.

The housing 310 may include a plurality of openings 312 formed on the first surface 310A through which the plurality of key caps 305-1 and 305-2 is at least partially exposed. The plurality of key caps 305-1 and 305-2 may protrude respectively through the plurality of openings 312. When stroking, the plurality of key caps 305-1 and 305-2 may be configured to move in the stroke direction P or the direction opposite to the stroke direction P through the plurality of openings 312 respectively corresponding to the plurality of key caps 305-1 and 305-2. In an example embodiment, the housing 310 may have a structure in which front surfaces of the plurality of key caps 305-1 and 305-2 are substantially exposed without the first surface 310A.

The electronic device 301 may include a base plate 350. The base plate 350 may include a first edge 350A (e.g., an upper edge of FIG. 3B), a second edge 350B (e.g., a lower edge) opposite to the first edge 350A, a third edge 350C (e.g., a first side edge) between the first edge 350A and the second edge 350B, and a fourth edge 350D (e.g., a second side edge) that is opposite to the third edge 350C and is between the first edge 350A and the second edge 350B.

In an example embodiment, the base plate 350 may include a notch 350E formed on the third edge 350C. In an example embodiment, the notch 350E may be formed on another edge (e.g., the fourth edge 350D).

The base plate 350 may include the board plate 352 and a plurality of key patterns 354 formed on the board plate 352. The plurality of key patterns 354 may be disposed to respectively correspond to the plurality of keys 303-1, 303-2, 303A, and 303B. When stroking at least one key 303-1 of the plurality of keys 303-1, 303-2, 303A, and 303B, the switch 307 corresponding to the key cap 305-1 of the stroked key may be transformed, the transformed switch 307 may contact the key pattern 354, and an input signal may be generated by the key pattern 354. The plurality of key patterns 354 may be formed as an arbitrary appropriate shape respectively corresponding to the plurality of keys 303-1, 303-2, 303A, and 303B.

In an example embodiment, the base plate 350 may be formed of a metal material. In an example embodiment, the board plate 352 may be formed of a flexible material. The board plate 352 may include, for example, a film. In an example embodiment, the plurality of key patterns 354 may respectively include an electrode or a membrane sheet configured to generate an input signal.

In an example embodiment, the electronic device 301 may include a first haptic actuator 331 and a second haptic actuator 332 respectively configured to generate vibration, a haptic plate 334 configured to be vibrated by the first haptic actuator 331 and/or the second haptic actuator 332 and configured to transmit vibration to the key caps 305-1 and 305-2, and a connection structure 336 configured to connect the first haptic actuator 331 to the haptic plate 334 and the second haptic actuator 332 to the haptic plate 334.

In an example embodiment, the first haptic actuator 331 may be configured to generate vibration at a first magnitude and the second haptic actuator 332 may be configured to generate vibration at a second magnitude that is different from the first magnitude. In an example embodiment, the first magnitude may be greater than the second magnitude. In an example embodiments, the first magnitude may be less than the second magnitude. In an example embodiment, the first haptic actuator 331 and the second haptic actuator 332 may be configured to generate vibration at substantially the same magnitude.

In an example embodiment, the first haptic actuator 331 and the second haptic actuator 332 may be substantially simultaneously driven. In an example embodiment, the first haptic actuator 331 and the second haptic actuator 332 may be driven at different times. For example, after the first haptic actuator 331 is driven, the second haptic actuator 332 may be driven. In one example, after the second haptic actuator 332 is driven, the first haptic actuator 331 may be driven.

In an example embodiment, the first haptic actuator 331 and the second haptic actuator 332 may be configured to generate vibrations in different directions. For example, when the first haptic actuator 331 generates vibration in a first direction (e.g., the −X direction of FIG. 3C), the second haptic actuator 332 may be configured to generate vibration in a second direction (e.g., the +X direction of FIG. 3C).

In an example embodiment, the first haptic actuator 331 and the second haptic actuator 332 may be configured to generate vibration in a substantially horizontal direction. In an example embodiment, at least one of the first haptic actuator 331 and the second haptic actuator 332 may generate vibration in a substantially vertical direction (e.g., the + or −Z direction). In an example embodiment, at least one of the first haptic actuator 331 and the second haptic actuator 332 may generate vibration in arbitrary directions respectively intersecting the horizontal direction (e.g., the + or −X direction or + or −Y direction) and the vertical direction (e.g., the + or −Z direction).

In an example embodiment, the first haptic actuator 331 and the second haptic actuator 332 may be substantially arranged in a line in the housing 310. For example, the first haptic actuator 331 and the second haptic actuator 332 may be arranged in respectively parallel directions with the first edge 350A and the second edge 350B on the base plate 350. In one example, the first haptic actuator 331 may be disposed adjacent to the third edge 350C and the second haptic actuator 332 may be disposed adjacent to the fourth edge 350D.

In an example embodiment, the electronic device 301 may include a single haptic actuator 331 or 332. In an example embodiment, the electronic device 301 may also include an additional haptic actuator other than the number of illustrated haptic actuators.

In an example embodiment, the haptic plate 334 may be configured to transmit vibration to the key cap 305-1 of at least one key 303-1 that is stroked and may be configured to not transmit vibration to the key cap 305-2 of the other key(s) 303-2 that is (are) not stroked. The haptic plate 334 may provide independent key usability to a user by transmitting vibration only to the stroked key(s) 303-1 of the plurality of keys 303-1 and 303-2.

In an example embodiment, the haptic plate 334 may transmit vibration in a substantially horizontal direction (e.g., a direction intersecting the stroke direction P and/or a direction intersect the opposite direction thereof) to the stroked key cap 305-1. In an example embodiment, the haptic plate 334 may transmit vibration in the vertical direction (e.g., the stroke direction P and/or the opposite direction thereof) to the stroked key cap 305-1.

In an example embodiment, the haptic plate 334 may be configured to be in contact with a side surface of the key cap 305-1 or 305-2. In an example embodiment, the haptic plate 334 may be configured to be in contact with another surface (e.g., the bottom surface) of the key cap 305-1 or 305-2.

In an example embodiment, the haptic plate 334 may be disposed on the board plate 352. In an example embodiment, the haptic plate 334 may substantially cover a surface (e.g., the top surface of FIG. 3C) of the board plate 352. In some embodiments, the haptic plate 334 may substantially cover one side of the substrate plate 352 excluding the key pattern 354. In some embodiments, haptic plate 334 may substantially cover one side of substrate plate 352 excluding opening 312.

In an example embodiment, haptic plate 334 may be a single haptic plate 334.

In an example embodiment, the connection structure 336 may mechanically connect the first haptic actuator 331 and the haptic plate 334 and mechanically connect the second haptic actuator 332 and the haptic plate 334. The connection structure 336 may have, for example, a linkage structure, but is not limited thereto, and transmits the vibration generated from the first haptic actuator 331 and/or the second haptic actuator 332 to the haptic plate 334. It may have any structure suitable for delivery to.

In an example embodiment, the connection structure 336 may vibrate in a vertical direction (e.g., +/−Z direction) and/or horizontal direction (e.g., +/−X direction or +/−Y direction). For example, the connection structure 336 transmits the vibration generated from the first haptic actuator 331 and/or the second haptic actuator 332 to the haptic plate 334, and the haptic plate 334 moves in the vertical direction (It may be configured to oscillate in a horizontal direction (e.g., +/−Z direction) and/or in a horizontal direction (e.g., +/−X direction or +/−Y direction).

Figure 4A:
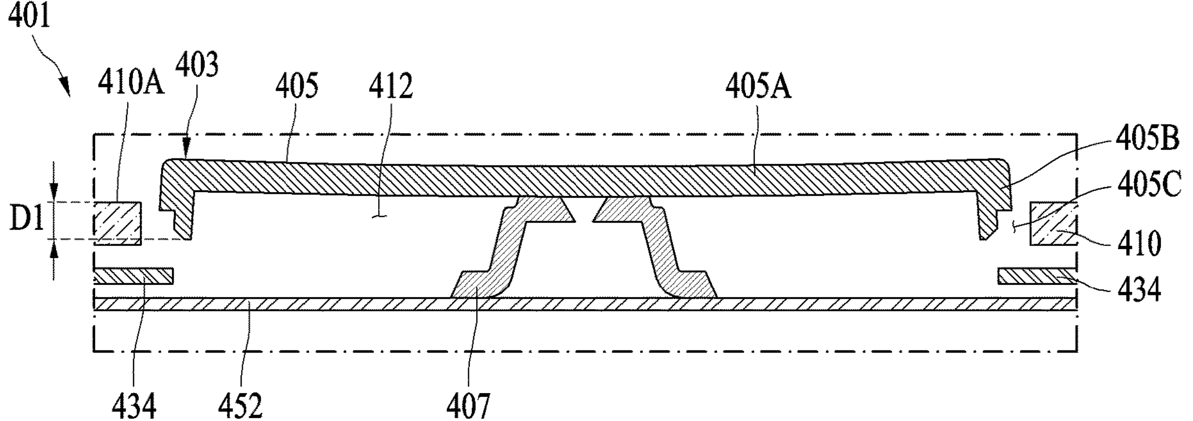
FIG. 4A is a diagram illustrating a key that is not stroked in an electronic device according to an example embodiment.
Figure 4B:
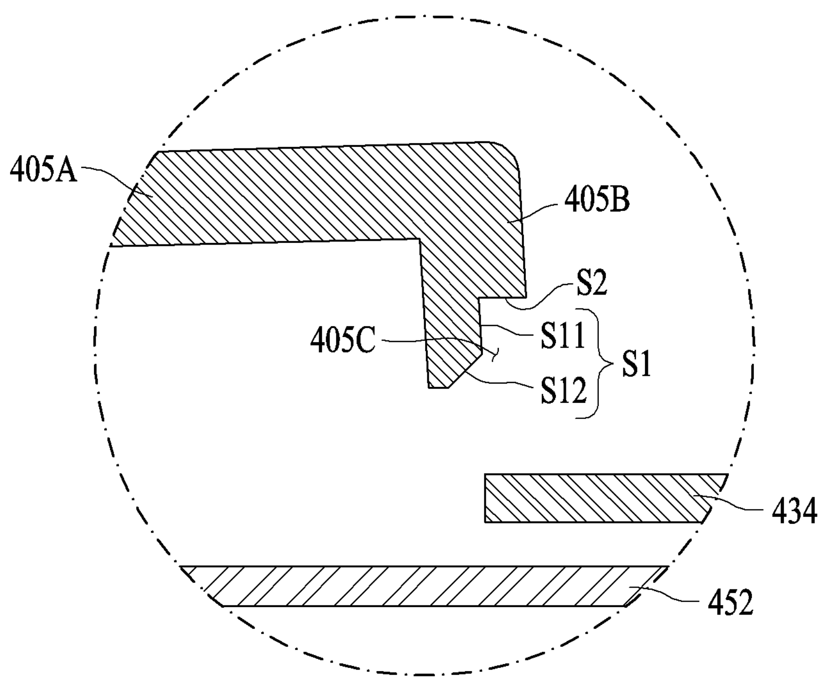
FIG. 4B is a diagram illustrating a key that is not stroked and a haptic plate in an electronic device according to an example embodiment.
Figure 4C:
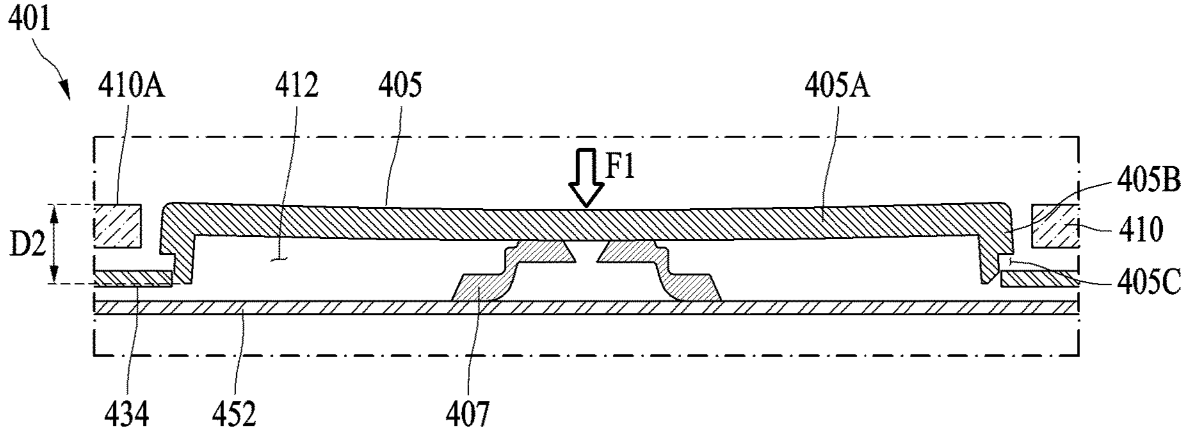
FIG. 4C is a diagram illustrating a stroked key at a first stroke depth in an electronic device according to an example embodiment.
Figure 4D:
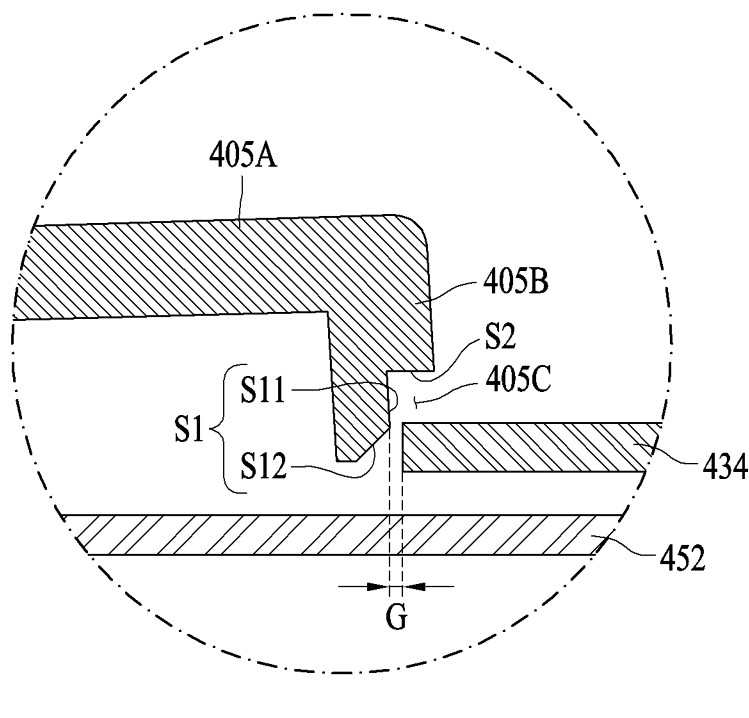
FIG. 4D is a diagram illustrating a stroked key at the first stroke depth in an electronic device and a haptic plate according to an example embodiment.
Figure 4E:
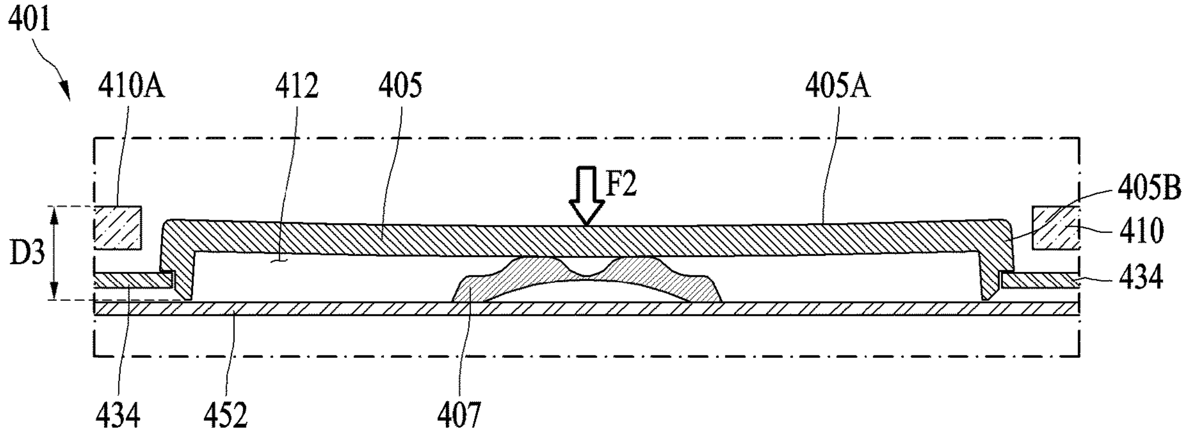
FIG. 4E is a diagram illustrating a stroked key at a second stroke depth in an electronic device according to an example embodiment.
Figure 4F:
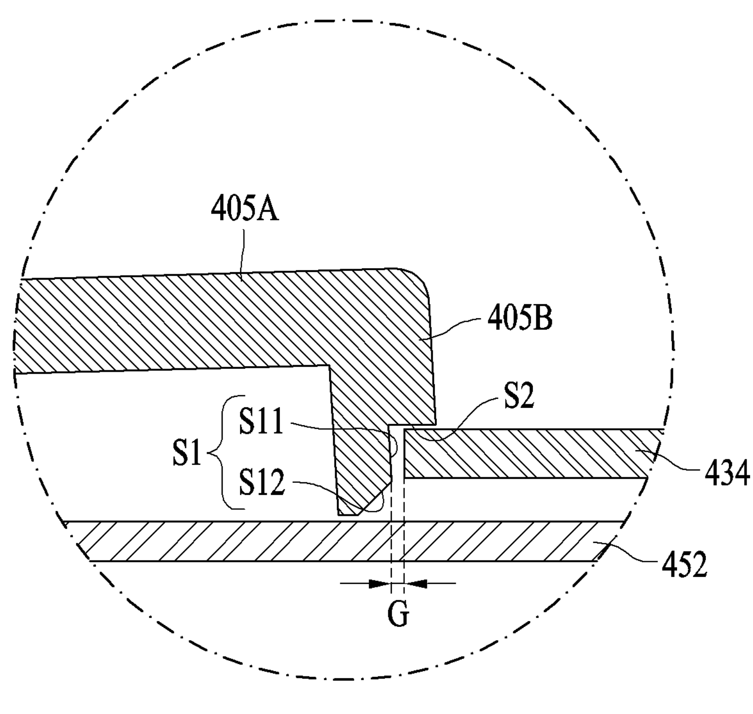
FIG. 4F is a diagram illustrating a stroked key at the second stroke depth in an electronic device and a haptic plate according to an example embodiment.

FIG. 4A is a diagram illustrating a key that is not stroked in an electronic device according to an example embodiment. FIG. 4B is a diagram illustrating a key that is not stroked and a haptic plate in an electronic device according to an example embodiment. FIG. 4C is a diagram illustrating a stroked key at a first stroke depth in an electronic device according to an example embodiment. FIG. 4D is a diagram illustrating a stroked key at the first stroke depth in an electronic device and a haptic plate according to an example embodiment. FIG. 4E is a diagram illustrating a stroked key at a second stroke depth in an electronic device according to an example embodiment. FIG. 4F is a diagram illustrating a stroked key at the second stroke depth in an electronic device and a haptic plate according to an example embodiment.

An interaction between a haptic plate 434 (e.g., the haptic plate 334) and a key cap 405 (e.g., the key caps 305-1 and 305-2) of a key 403 (e.g., the keys 303-1 and 303-2 of FIGS. 3A to 3C) according to a stroke depth in an electronic device 401 (e.g., the electronic device 401) is described with reference to FIGS. 4A to 4F, sequentially.

Referring to FIGS. 4A to 4F, the key cap 405 may include a base part 405A to which a stroke is applied, a side part 405B connected, directly or indirectly, to the base part 405A, and a recessed part 405C formed in the side part 405B.

In an example embodiment, the haptic plate 434 may be substantially configured to at least partially contact the recessed part 405C. In an example embodiment, the haptic plate 434 may contact the side part 405B excluding the recessed part 405C.

In an example embodiment, the recessed part 405C may include a guide surface S1 configured to guide the haptic plate 434 and a seat surface S2 which is connected, directly or indirectly, to the guide surface S1 and on which at least a portion of the haptic plate 434 is disposed. When the haptic plate 434 is disposed on the seat surface S2, vibration of the haptic plate 434 may be transmitted to an entirety of the key cap 405 through the seat surface S2.

In an example embodiment, the guide surface S1 may be substantially and at least partially parallel with one surface of the side part 405B excluding the recessed part 405C. The seat surface S2 may be substantially parallel with one surface (e.g., a top surface) of the base part 405A. In an example embodiment, the seat surface S2 may be connected, directly or indirectly, to a surface of the side part 405B excluding the recessed part 405C.

In an example embodiment, the guide surface S1 may include a flat surface S11 that is substantially flat and a chamfered surface S12 that is inclined to the flat surface S11. The inclination of the chamfered surface S12 may be set based on the vibration of the haptic plate 434. For example, the inclination of the chamfered surface S12 may be, for example, substantially the same or greater than a vibration amount of the haptic plate 434. The chamfered surface S12 may improve a press or stroke of the key cap 405 and may improve a contact between the key cap 405 and the haptic plate 434.

In an example embodiment, the haptic plate 434 may have a width of approximately 0.3 mm. In an example embodiment, the flat surface S11 may have a height of approximately 0.4 mm, the chamfered surface S12 may have a height of approximately 0.2 mm and a width of approximately 0.3 mm, and the seat surface S2 may have a width of approximately 0.4 mm. In an example embodiment, the flat surface S11 and the haptic plate 434 may form a gap G and the gap G may have a width of approximately 0.1 mm.

In an example embodiment, the recessed part 405C may extend to one surface (e.g., a bottom surface) of the key cap 405. For example, the chamfered surface S12 may be connected, directly or indirectly, to one surface (e.g., the bottom surface) of the key cap 405. For example, instead of the chamfered surface S12, the flat surface S11 may be connected, directly or indirectly, to the surface (e.g., the bottom surface) of the key cap 405. For example, the chamfered surface S12 and the flat surface S11 may be integrally formed or at least one of the chamfered surface S12 and the flat surface S11 may be omitted and connected, directly or indirectly, to the surface (e.g., the bottom surface) of the key cap 405. For example, a shape of the chamfered surface S12 may include a curved surface.

FIGS. 4A and 4B illustrate a positional relationship between the haptic plate 434 and the key cap 405 that is not stroked when a distance between the bottom surface of the key cap 405 and a first surface 410A (e.g., the first surface 310A) of a housing 410 (e.g., the housing 310) is D1.

The key cap 405 may not substantially press a switch 407 (e.g., the switch 307) on an opening 412 (e.g., the opening 312), the switch 407 may not substantially press a board plate 452 (e.g., the board plate 352), and an input signal for driving the haptic plate 434 may not be substantially generated. The key cap 405 may not enter substantially the same plane as the haptic plate 434.

FIGS. 4C and 4D illustrate a positional relationship between the haptic plate 434 and the key cap 405 that is stroked when a distance between the bottom surface of the key cap 405 and the first surface 410A is D2 (e.g., in the case of a first stroke depth of the key cap 405) that is greater than D1 as a first force F1 at a first magnitude is applied to the key cap 405. A difference between D1 and D2 may be, for example, approximately 0.8 mm.

The key cap 405 may move in a stroke direction (e.g., a downward direction) through the opening 412 and may press the switch 407, the switch 407 may press the board plate 452, an input signal for driving the haptic plate 434 may be generated, information about the stroked key 403 may be sensed, driving of a haptic actuator (e.g., the first haptic actuator 331 and/or the second haptic actuator 332) may be initiated. The key cap 405 may enter substantially the same plane as the haptic plate 434. The guide surface S1 may be disposed to at least partially overlap with the haptic plate 434. The guide surface S1 may form the gap G with the haptic plate 434. While the key cap 405 is stroked, the gap G between the guide surface S1 and the haptic plate 434 may be substantially and constantly maintained.

FIGS. 4E and 4F illustrate a positional relationship between the haptic plate 434 and the key cap 405 that is stroked when a distance between the bottom surface of the key cap 405 and the first surface 410A is D3 (e.g., in the case of a second stroke depth of the key cap 405) that is greater than D2 as a second force F2 at a second magnitude, which is greater than the first magnitude, is applied to the key cap 405. A difference between D2 and D3 may be, for example, approximately 0.2 mm.

The key cap 405 may further move in the stroke direction (e.g., the downward direction) through the opening 412 and may further press the switch 407, the switch 407 may further press the board plate 452, and information about the stroke depth of the key cap 405 may be sensed. The driving of the haptic actuator (e.g., the first haptic actuator 331 and/or the second haptic actuator 332) may be initiated from the first stroke depth. However, complete vibration of the haptic plate 434 may be initiated at the second stroke depth by considering a driving response time for transmission from the haptic actuator to the haptic plate 434. The haptic plate 434 may be disposed on the seat surface S2 and the vibration of the haptic plate 434 may be transmitted to an entirety of the key cap 405 through the seat surface S2.

Meanwhile, while the key cap 405 is stroked, the gap G between the guide surface S1 and the haptic plate 434 may be substantially and constantly maintained and a surface (e.g., the top surface) of the haptic plate 434 may be in surface contact with the seat surface S2. Maintaining the gap G may assist the key cap 405 to return to an original position (e.g., the position of FIGS. 4A and 4B) when releasing the stroke of the key cap 405.

Figure 4G:
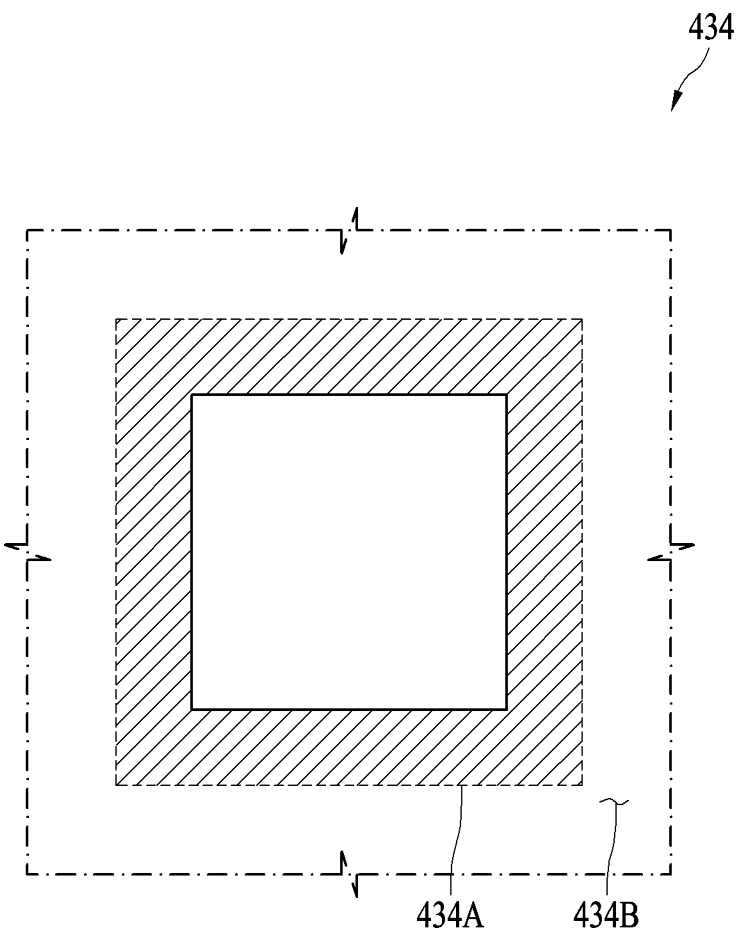
FIG. 4G is a diagram illustrating a partial area of a haptic plate corresponding to a stroked key according to an example embodiment.

FIG. 4G is a diagram illustrating a partial area of a haptic plate corresponding to a stroked key according to an example embodiment.

Referring to FIG. 4G, the haptic plate 434 may include a contact area 434A that is at least partially in contact with the seat surface S2 and a non-contact area 434B that does not contact the seat surface S2. In an example embodiment, surface roughness of the contact area 434A may be greater than surface roughness of the non-contact area 434B. For example, the contact area 434A may be formed of a corroded surface. In one example, the corrosion of the contact area 434A may be formed by laser, etching, sand blasting, and/or other appropriate corroded surface formation methods. Forming the contact area 434A of the haptic plate 434 of a corroded surface may increase a size of a contact area between the contact area 434A and the seat surface S2 when stroking the key cap 405, and may improve the vibration transmission efficiency from the haptic plate 434 to the key cap 405. In an example embodiment, the surface roughness of an area of the seat surface S2 that is in contact with the contact area 434A of the haptic plate 434 may be, for example, greater than surface roughness of other areas because the area is formed of a corroded surface.

In an example embodiment, the vibration of the haptic plate 434 may be transmitted to the key cap 405 in various manners. In one mode, when the key cap 405 is stroked and is at the first stroke depth as shown in FIGS. 4C and 4D, the vibration may be transmitted to the key cap 405 at a substantially short interval (e.g., approximately 10 ms), and thereafter, the transmission of vibration to the key cap 405 may stop because the vibration is not generated by the haptic actuator (e.g., the first haptic actuator 331 and/or the second haptic actuator 332). In one mode, when the key cap 405 is stroked and reaches the second stroke depth as shown in FIGS. 4E and 4E through the first stroke depth of FIGS. 4C and 4D, continuous vibration may be substantially transmitted to the key cap 405. Meanwhile, without being limited to the described embodiments, various types of vibration modes may be adjusted by a user.

In an example embodiment, the haptic actuator (e.g., the first haptic actuator 331 and/or the second haptic actuator 332) may be configured to operate in a state in which a stroke is not applied to the key cap 405. For example, when an alarm signal (e.g., a message, an event, or other alarm signals) is received by the electronic device 401, a haptic response may be provided to a user through the haptic actuator regardless of an input to the key 403. In one example, the flat surface S11 and/or the chamfered surface S12 may be at least partially coated to prevent or reduce shaking noise in the key cap 405 when the vibration of the haptic plate 434 is transmitted to the flat surface S11 and/or the chamfered surface S12. For example, the flat surface S11 and/or the chamfered surface S12 may be coated with a silicone member and/or other vibration or elasticity reduction members. For example, the flat surface S11, the chamfered surface S12, and the seat surface S2 may be coated. For example, the vibration or elasticity reduction member may reduce noise of the key cap 405 in both cases in which the key cap 405 is stroked or the key cap 405 is not stroked.

Figure 5:
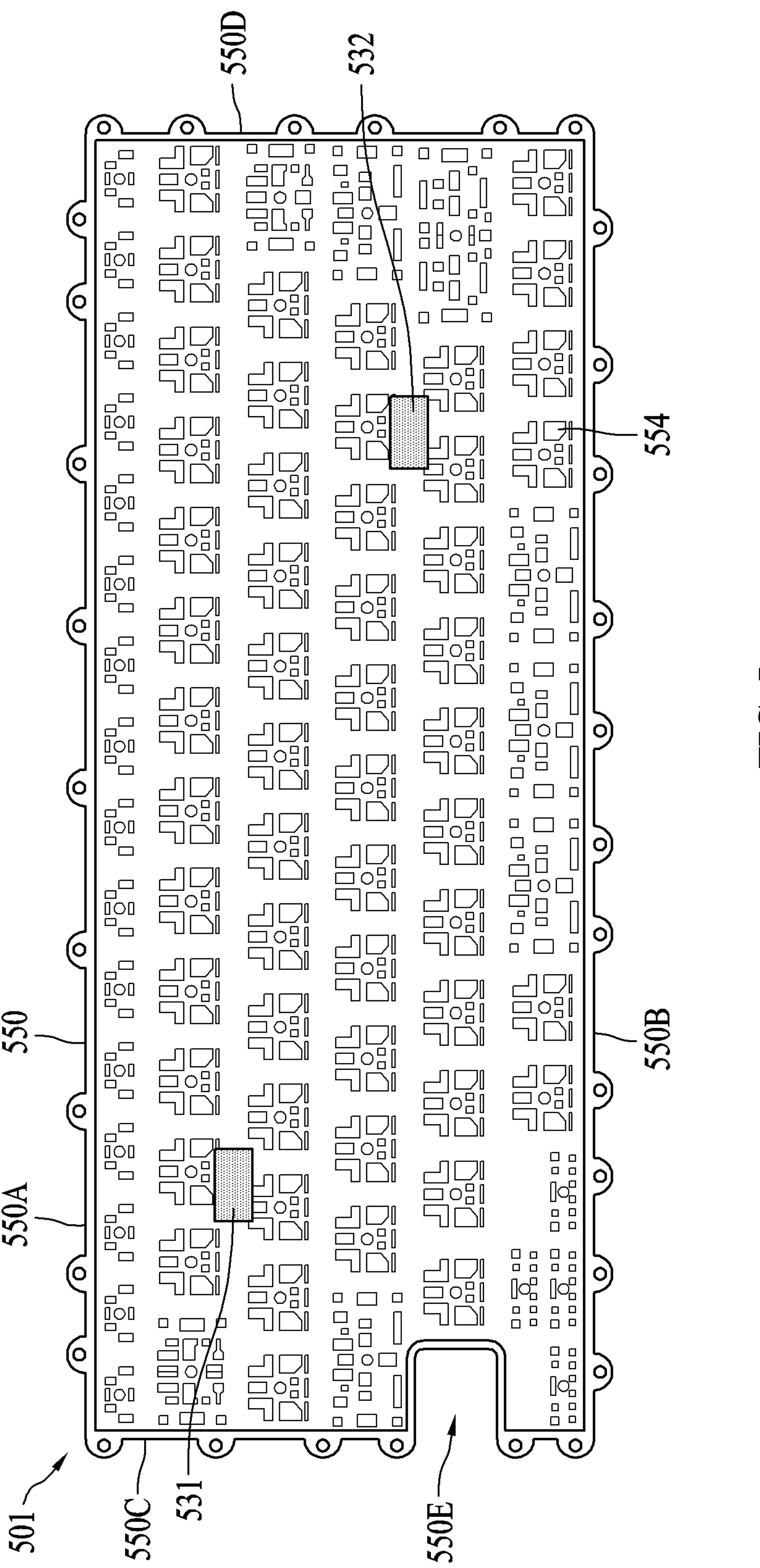
FIG. 5 is a plan view of a PCB in an electronic device according to an example embodiment.

FIG. 5 is a plan view of a PCB in an electronic device according to an example embodiment.

Referring to FIG. 5, an electronic device 501 (e.g., the electronic device 301 of FIGS. 3A to 3C) may include a base plate 550 (e.g., the base plate 350). The base plate 550 may include a first edge 550A (e.g., the first edge 350A), a second edge 550B (e.g., the second edge 350B), a third edge 550C (e.g., the third edge 350C), a fourth edge 550D (e.g., the fourth edge 350D), and a notch 550E (e.g., the notch 350E). The base plate 550 may include a board plate (e.g., the board plate 352) and a plurality of key patterns 554 (e.g., the key pattern 354). In an example embodiment, a first haptic actuator 531 (e.g., the first haptic actuator 331) and a second haptic actuator 532 (e.g., the second haptic actuator 332) may be arranged in directions (e.g., a diagonal direction) respectively intersecting the edges 550A, 550B, 550C, and 550D on the base plate 350. In an example embodiment, the first haptic actuator 531 and the second haptic actuator 532 may be spaced apart from the edges 550A, 550B, 550C, and 550D and may be disposed on the base plate 550.

Figure 6A:
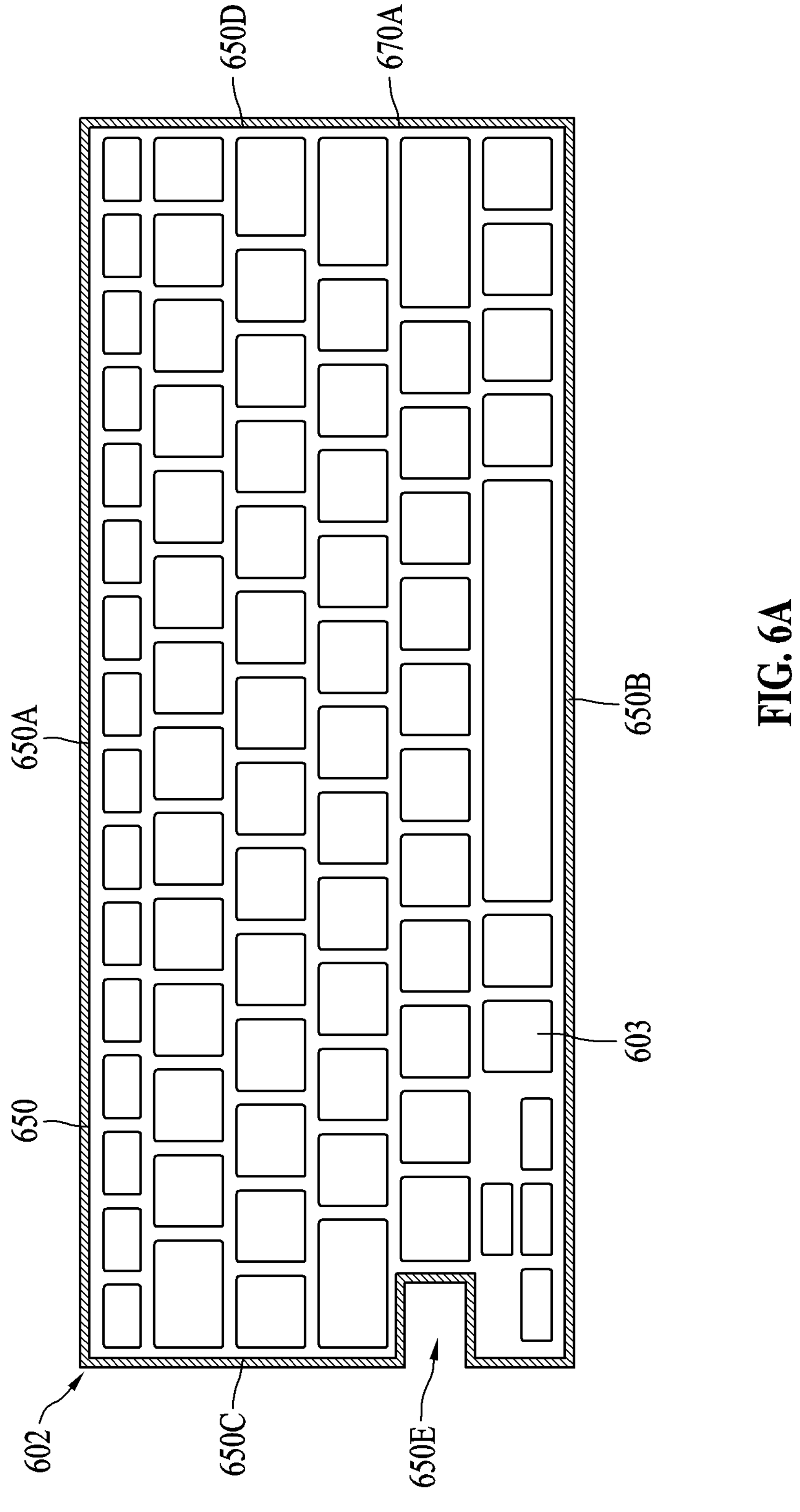
FIG. 6A is a plan view of a keyboard according to an example embodiment.

FIG. 6A is a plan view of a keyboard according to an example embodiment.

Referring to FIG. 6A, a keyboard 602 (e.g., the keyboard 302) may include a plurality of keys 603 (e.g., the keys 303-1 and 303-2). The keyboard 602 may be disposed on a base plate 650 (e.g., the base plate 350) having a plurality of edges 650A, 650B, 650C, and 650D (e.g., the first edge 350A, the second edge 350B, the third edge 350C, and the fourth edge 350D).

In an example embodiment, a foam 670A may be disposed between the keyboard 602 and the base plate 650. The foam 670A may be at least partially formed along the edges 650A, 650B, 650C, and 650D of the base plate 650. The foam 670A may be disposed between the base plate 650 and a haptic plate (e.g., the haptic plate 334). The foam 670A may cause the haptic plate to maintain a floating state in the keyboard 602. The foam 670A may have, for example, a tape shape. In an example embodiment, the foam 670A may be formed on the notch 650E.

Figure 6B:
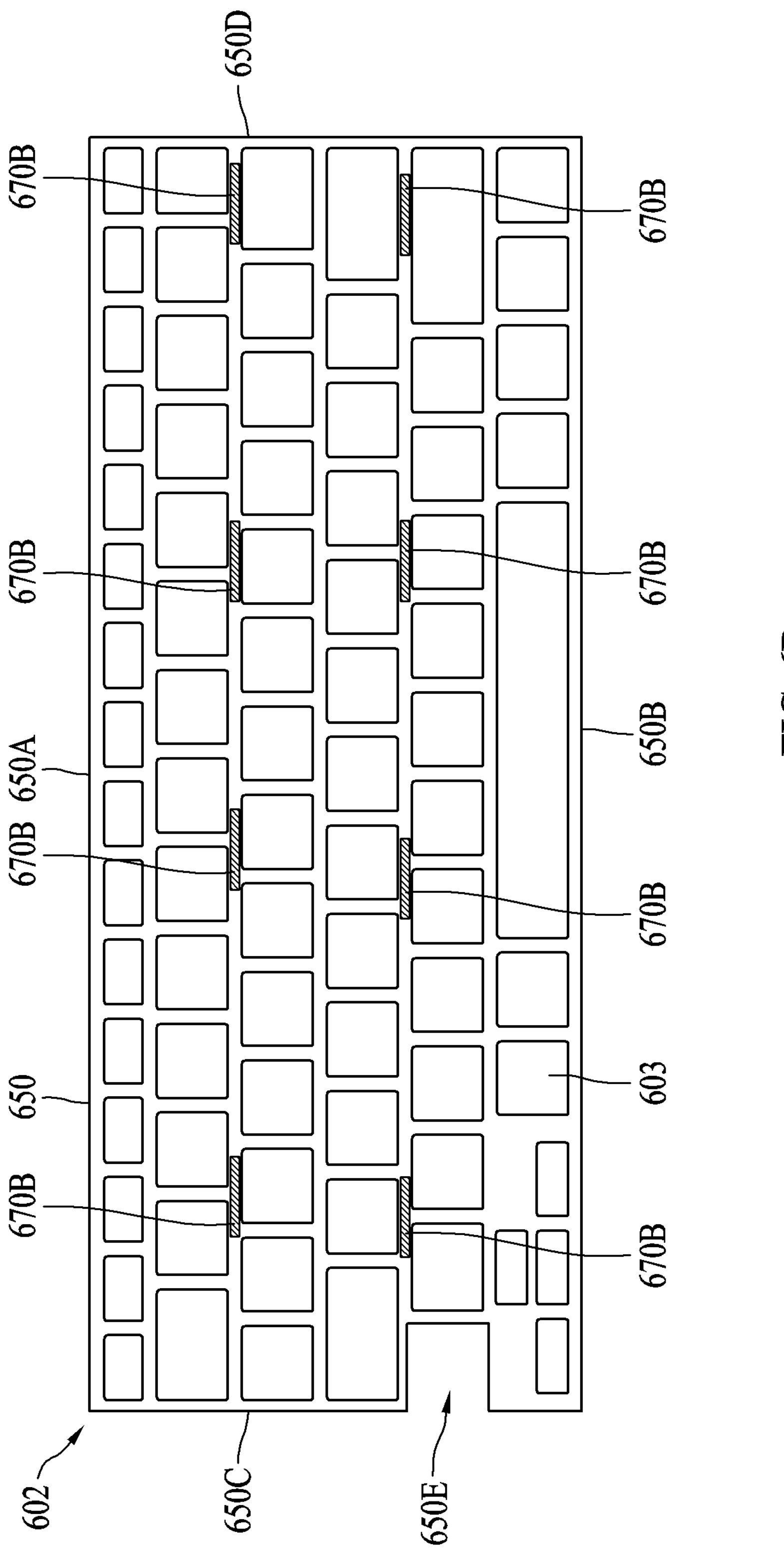
FIG. 6B is a plan view of a keyboard according to an example embodiment.

FIG. 6B is a plan view of a keyboard according to an example embodiment.

Referring to FIG. 6B, at least one foam 670B may be disposed between the keyboard 602 and the base plate 650 and may be disposed on an area between the plurality of edges 650A, 650B, 650C, and 650D. The foam 670B may be disposed on an area on the base plate 650 corresponding to an area between the plurality of keys 603. The foam 670B may be disposed between the base plate 650 and the haptic plate (e.g., the haptic plate 334). In an example embodiment, the foam 670B may not be formed on the notch 650E.

Figure 7:
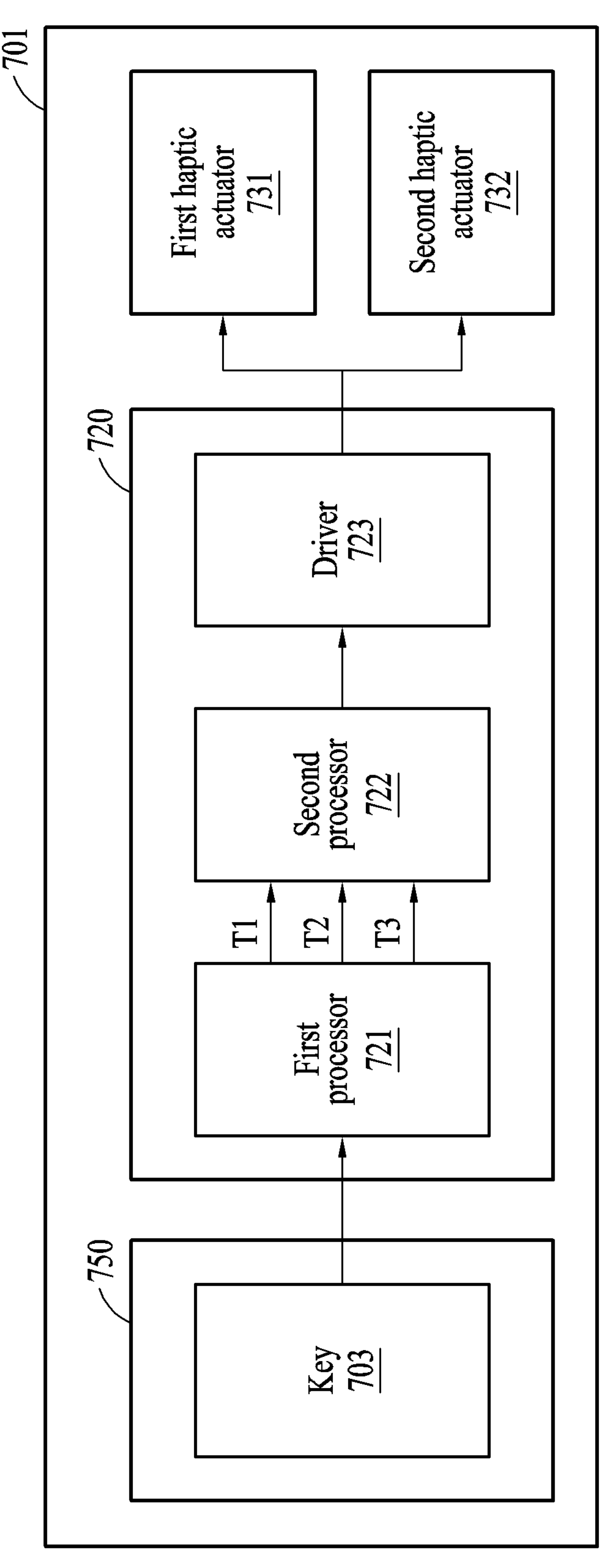
FIG. 7 is a block diagram of an electronic device according to an example embodiment.

FIG. 7 is a block diagram of an electronic device according to an example embodiment.

Referring to FIG. 7, an electronic device 701 (e.g., the electronic device 101 of FIG. 1 and/or the electronic device 301 of FIGS. 3A to 3C) may include an input module 750 (e.g., the input module 150 and/or the keyboard 302) including a plurality of keys 703, a processor 720 (e.g., the processor 120), a first haptic actuator 731 (e.g., the first haptic actuator 331), and a second haptic actuator 732 (e.g., the second haptic actuator 332).

In an example embodiment, the processor 720 may include a first processor 721 configured to receive an input signal of the key 703 that is stroked among the plurality of keys 703 and generate trigger signals T1, T2, and T3 of various types of waves, a second processor 722 configured to generate multiple types of haptic modes (e.g., 2^3=8 modes) by combining the trigger signals T1, T2, and T3, and a driver 723 configured to drive the first haptic actuator 731 and/or the second haptic actuator 732 based on the multiple types of haptic modes.

In an example embodiment, the processor 720 may differently determine a magnitude of vibration generated by the first haptic actuator 731 and/or the second haptic actuator 732 based on a distance between the key 703 that is stroked and the first haptic actuator 731 and/or the second haptic actuator 732. The processor 720 may receive distances between the first haptic actuator 731 and each of the plurality of keys 703, and/or distances between the second haptic actuator 732 and each of the plurality of keys 703. In an example in which a distance between a letter H key and the first haptic actuator 731 is greater than a distance between a letter S key and the second haptic actuator 732, an input value to the letter H key may be set to be greater than an input value to the letter S key, and the magnitude of vibration with respect to the first haptic actuator 731 may be adjusted by adjusting a waveform in the first processor 721. Differently determining the magnitude of generated vibration depending on a distance between the key 703 and the haptic actuator 731 or 732 may cause the user to feel substantially the same haptic response by considering the vibration transmission efficiency according to the distance.

In an example embodiment, the driver 723 may simultaneously drive the first haptic actuator 731 and the second haptic actuator 732. In an example embodiment, the driver 723 may drive the first haptic actuator 731 and the second haptic actuator 732 at different times. For example, the driver 723 may sequentially drive the first haptic actuator 731 and the second haptic actuator 732.

Figure 8:
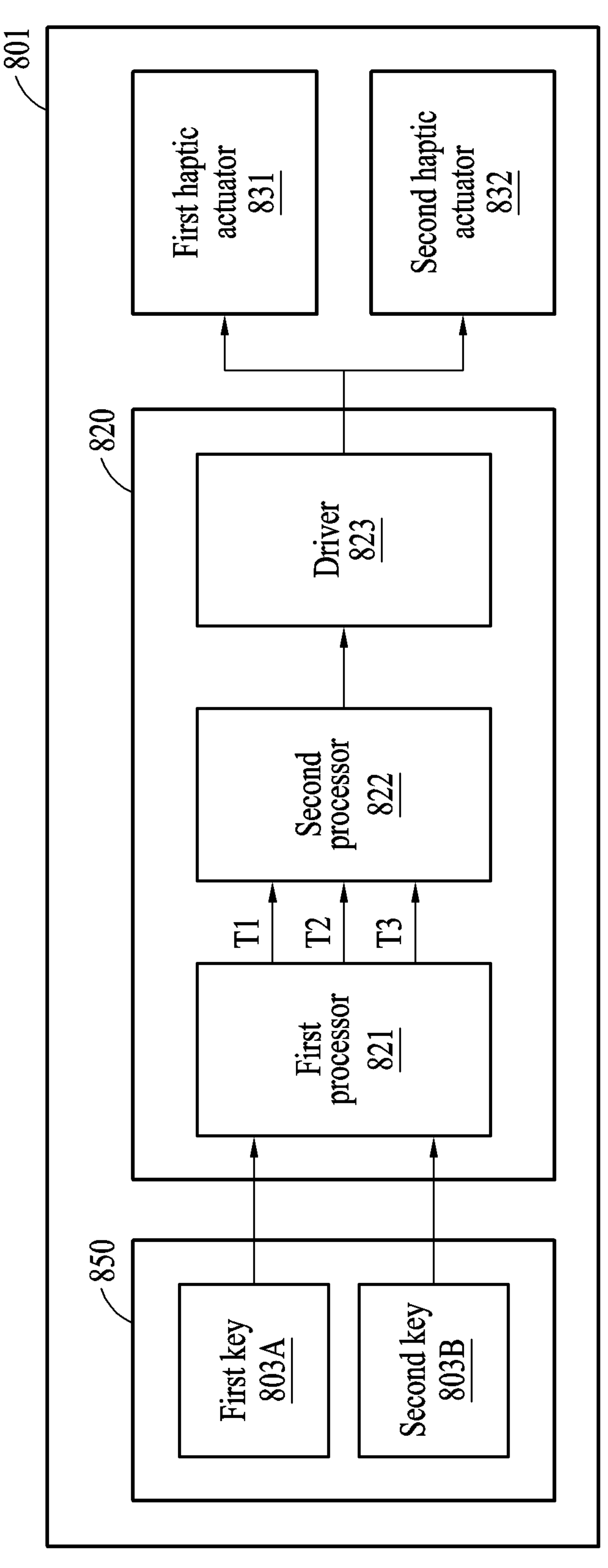
FIG. 8 is a block diagram of an electronic device according to an example embodiment.

FIG. 8 is a block diagram of an electronic device according to an example embodiment.

Referring to FIG. 8, an electronic device 801 (e.g., the electronic device 101 of FIG. 1, the electronic device 301 of FIGS. 3A to 3C, and/or the electronic device 701 of FIG. 7) may include an input module 850 (e.g., the input module 750 and/or the keyboard 302) including a first key 803A (e.g., the first key 303A of FIG. 3A) of a first type and a second key 803B (e.g., the second key 303B of FIG. 3A) of a second type, a processor 820 (e.g., the processor 720), a first haptic actuator 831 (e.g., the first haptic actuator 731), and a second haptic actuator 832 (e.g., the second haptic actuator 732). The processor 820 may include a first processor 821 (e.g., the first processor 721), a second processor 822 (e.g., the second processor 722), and a driver 823 (e.g., the driver 723).

In an example embodiment, the processor 820 may cause the first haptic actuator 831 and/or the second haptic actuator 832 to generate vibration in various manners based on a combination of the first key 803A and the second key 803B.

In one example, the processor 820 may prevent or reduce chances of the first haptic actuator 831 and/or the second haptic actuator 832 from generating vibration when stroking a shift key, a ctrl key, an alt key, and a combination thereof among the first key 803A, and may cause the first haptic actuator 831 and/or the second haptic actuator 832 to generate vibration after a stroke of the second key 803B is initiated.

In one example, the processor 820 may cause the first haptic actuator 831 and/or the second haptic actuator 832 to generate vibration whenever each of the first key 803A and the second key 803B is stroked.

In one example, when the first key 803A (e.g., a function key to enable or disable a determined function) is stroked, a first haptic pattern (e.g., vibration at a first cycle) may be provided to a user by the first haptic actuator 831 and/or the second haptic actuator 832, and when the second key 803B is stroked while the first key 803A is stroked, a second haptic pattern (e.g., vibration at a second cycle that is different from the first cycle) that is at least partially different from the first haptic pattern may be provided to the user by the first haptic actuator 831 and/or the second haptic actuator 832. For example, providing different haptic patterns to the user may allow the user to intuitively recognize that a specific function is executed.

Figure 9:
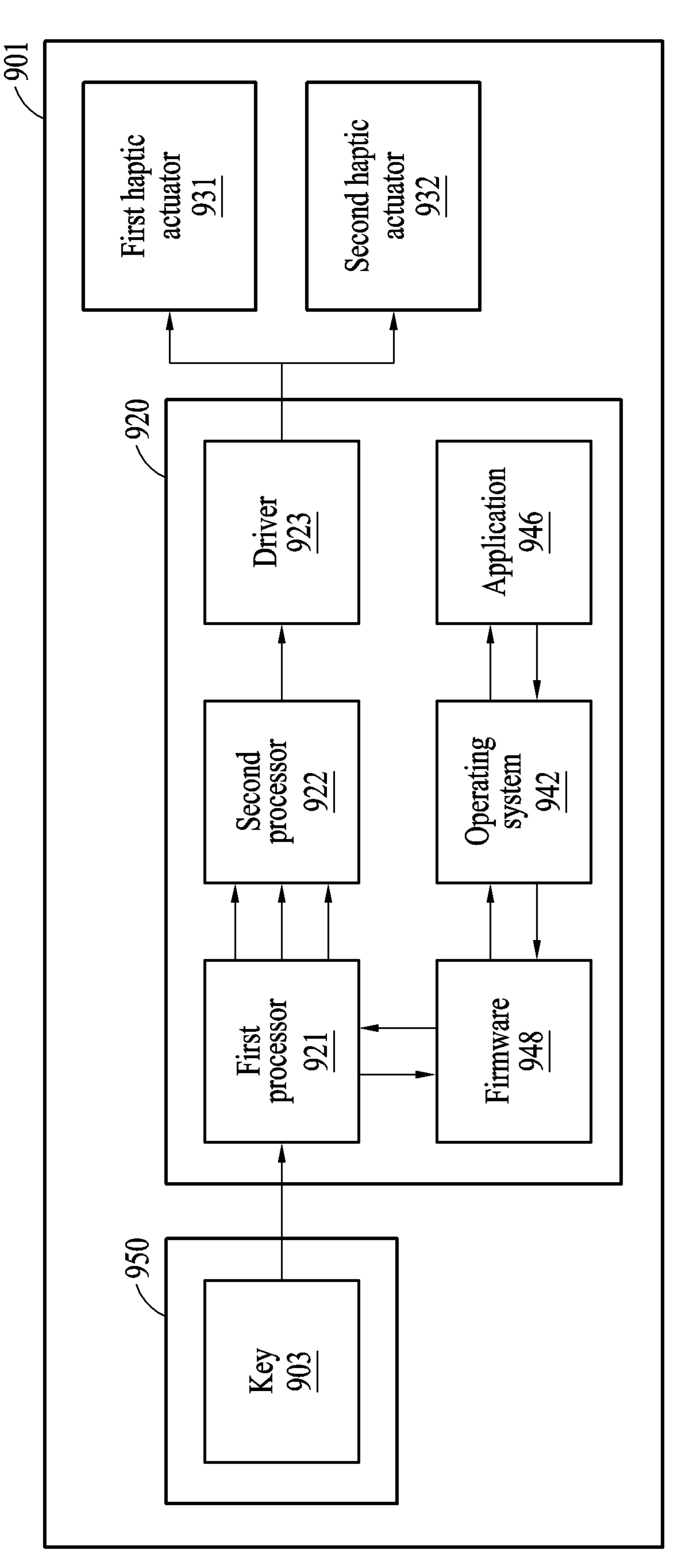
FIG. 9 is a block diagram of an electronic device according to an example embodiment.

FIG. 9 is a block diagram of an electronic device according to an example embodiment.

Referring to FIG. 9, an electronic device 901 (e.g., the electronic device 101 of FIG. 1, the electronic device 301 of FIGS. 3A to 3C, and/or the electronic device 701 of FIG. 7) may include an input module 950 (e.g., the input module 750 and/or the keyboard 302) including a plurality of keys 903 (e.g., the key 703), a processor 920 (e.g., the processor 720), a first haptic actuator 931 (e.g., the first haptic actuator 731), and a second haptic actuator 932 (e.g., the second haptic actuator 732). The processor 920 may include a first processor 921 (e.g., the first processor 721), a second processor 922 (e.g., the second processor 722), and a driver 923 (e.g., the driver 723).

In an example embodiment, the processor 920 may include an OS 942 (e.g., the OS 142), an application 946 (e.g., the application 146), and firmware 948 (e.g., a basic input/output system (BIOS)). When an input (e.g., a typo) of a user that deviates from a determined input system is recognized in the application 946, the user may recognize an unintentional input by providing haptic feedback to the user by transmitting a signal sequentially from the OS 942, the firmware 948, and the first processor 921 and generating vibration in the first haptic actuator 931 and/or the second haptic actuator 932 through the driver 923.

One aspect of the disclosure may provide an electronic device including a key that provides an improved haptic response to a user according to a key stroke.

The electronic device 301 according to embodiments may include the housing 310, the plurality of keys 303-1 and 303-2 disposed in the housing 310 and respectively including key caps 305-1 and 305-2 configured to move in the stroke direction P during a stroke, the first haptic actuator 331 configure to generate vibration when at least one key 303-1 of the plurality of keys 303-1 and 303-2 is stroked, and the haptic plate 334 configured to be vibrated by the first haptic actuator 331 and configured to cause the key cap 305-1 of the at least one key 303-1 that is stroked among the plurality of keys 303-1 and 303-2 to vibrate.

In an example embodiment, the key cap 405 may include the base part 405A, and the side part 405B connected, directly or indirectly, to the base part 405A, and the key cap 405 may further include the recessed part 405C formed in the side part 405B and configured to contact at least a portion of the haptic plate 434.

In an example embodiment, the recessed part 405C may include the guide surface S1 configured to guide the haptic plate 434 and the seat surface S2 which is connected, directly or indirectly, to the guide surface S1 and on which the haptic plate 434 is disposed.

In an example embodiment, the recessed part 405C may include the chamfered surface S12 formed on the guide surface S1.

In an example embodiment, the haptic plate 434 may form the gap G with the guide surface S1 at the first stroke depth of the at least one key cap 405 and may be configured to contact the seat surface S2 along the guide surface S1 at the second stroke depth that is greater than the first stroke depth of the at least one key cap 405.

In an example embodiment, the haptic plate 434 may be configured to move along the guide surface S1 while maintaining the gap G with the guide surface S1 at the second stroke depth.

In an example embodiment, the first haptic actuator 331 or 731 may be configured to not generate vibration after a determined time at the second stroke depth.

In an example embodiment, the first haptic actuator 331 or 731 may be configured to continuously generate vibration when the stroke depth is greater than the first stroke depth.

In an example embodiment, the electronic device 301 may further include the second haptic actuator 332 configured to cause the haptic plate 334 to vibrate and configured to generate vibration of a magnitude that is different from a magnitude of the vibration of the first haptic actuator 331 when the at least one key 303-1 is stroked.

In an example embodiment, the first haptic actuator 331 and the second haptic actuator 332 may be configured to be driven simultaneously or at different times.

In an example embodiment, the first haptic actuator 331 and the second haptic actuator 332 may be arranged in a substantially parallel direction relative to the edge of the housing 310.

In an example embodiment, the first haptic actuator 331 and the second haptic actuator 332 may be arranged in a direction intersects the edge of the housing 310.

In an example embodiment, the electronic device 301 may further include the base plate 350 or 650 disposed in the housing 310 and configured to support the plurality of keys 303 or 603 and the foam 670A disposed between the haptic plate 334 and the base plate 350 or 650 along the edge of the base plate 350 or 650.

In an example embodiment, the electronic device 301 may further include the base plate 350 or 650 disposed in the housing 310 and configured to support the plurality of keys 303 or 603 and the foam 670B disposed between the haptic plate 334 and the base plate 350 or 650 and disposed in an inner area of the base plate 350 or 650.

In an example embodiment, the first haptic actuator 731 may be configured to generate vibration at a first magnitude on the first key 303-1 or 703 spaced apart from the first haptic actuator 731 by a first distance among the plurality of keys 303-1, 303-2, and 703, and may be configured to generate vibration at a second magnitude that is different from the first magnitude on the second key 303-2 or 703 spaced apart from the first haptic actuator 731 by a second distance that is different from the first distance among the plurality of keys 303-1, 303-2, and 703.

In an example embodiment, the haptic plate 434 may include the contact area 434A at least partially contacting the key cap 405 and formed of a corroded surface.

The electronic device 301 or 701 according to embodiments may include the housing 310, the plurality of keys 303 or 703 disposed in the housing 310, the first haptic actuator 331 or 731 configured to generate vibration when at least one key 303 or 703 of the plurality of keys 303 or 703 is stroked, the haptic plate 334 configured to be vibrated by the first haptic actuator 331 or 731 and configured to cause a stroked key 303 or 703 among the plurality of keys 303 or 703 to vibrate and configured to not vibrate the key 303 or 703 that is not stroked among the plurality of keys 303 or 703, and the processor 720 configured to drive the first haptic actuator 331 or 731 when at least one key 303 or 703 of the plurality of keys 303 or 703 is stroked.

In an example embodiment, the processor 720 may be configured to generate a plurality of haptic output signals to drive the first haptic actuator 731 by combining a plurality of trigger signals T1, T2, and T3 generated when the at least one key 703 of the plurality of keys 703 is stroked.

In an example embodiment, the electronic device 701 may further include the second haptic actuator 732 configured to cause the haptic plate 334 to vibrate and configured to generate vibration of a magnitude that is different from a magnitude of the vibration of the first haptic actuator 731.

In an example embodiment, the processor 720 may be configured to drive the first haptic actuator 731 and the second haptic actuator 732 simultaneously or at different times.

In an example embodiment, the plurality of keys 803A or 803B may include at least one first type key 803A and at least one second type key 803B, and the processor 820 may be configured to not drive the first haptic actuator 831 when the at least one first type key 803A is stroked and may be configured to drive the first haptic actuator 831 when the at least one first type key 803A is stroked and the at least one second type key 803B is stroked.

In an example embodiment, the plurality of keys 803A or 803B may include at least one first type key 803A and at least one second type key 803B, and the processor 820 may be configured to drive the first haptic actuator 831 when the at least one first type key 803A is stroked and may be configured to drive the first haptic actuator 831 when the at least one second type key 803B is stroked.

In an example embodiment, the electronic device 901 may further include the application 946 configured to recognize an input of a user and the processor 920 may be configured to drive the first haptic actuator 931 when an input of the user that deviates from a determined input system is recognized in the application 946.

The electronic device 301 or 401 according to embodiments may include the housing 410, the plurality of keys 403 disposed in the housing 410, the first haptic actuator 331 configure to generate vibration at a first stroke depth of at least one key 403 of the plurality of keys 403, and the haptic plate 434 configured to be vibrated by the first haptic actuator 331 and configured to vibrate a stroked key 403 among the plurality of keys 403 at a second stroke depth that is greater than the first stroke depth of at least one key 403 of the plurality of keys 403.

According to an example embodiment, a thickness of a key may be reduced. According to an example embodiment, an independent haptic response may be generated to the keys. According to an example embodiment, real-time information may be provided to a user by generating a haptic response according to a key stroke that is different from a user's intention and correction of the key stroke that the user intends may be induced. The effects of the electronic device according to embodiments are not limited to the above-mentioned effects, and other unmentioned effects can be clearly understood from the following description by one of ordinary skill in the art.

The features and advantages of embodiments described above may be combined with each other without resulting in apparent technical conflicts.

The invention claimed is:

1. An electronic device comprising:

a housing, a plurality of keys disposed at least partially in the housing and respectively comprising key caps configured to move in a stroke direction during a stroke, a first haptic actuator configured to generate vibration when at least one of the plurality of keys is stroked, and a haptic plate configured to be vibrated by the first haptic actuator and to vibrate the key cap of the at least one stroked key of the plurality of keys, wherein the key cap comprises:

a base part, a side part connected to a peripheral portion of the base part, the side part comprising an external surface positioned at an outermost periphery of the key cap, and a recessed part formed in the external surface of the side part, and wherein the recessed part comprises a guide surface configured to guide the haptic plate and a seat surface connected to a top end of the guide surface, wherein the guide surface and the seat surface are configured to be separated from the haptic plate before the at least one key is stroked and the seat surface is configured to come in contact with at least a portion of the haptic plate when the at least one key is stroked.

2. The electronic device of claim 1, wherein a bottom end of the guide surface comprises a chamfered surface.

3. The electronic device of claim 1, wherein the haptic plate forms a gap with the guide surface at a first stroke depth of the at least one key cap and is configured to be in contact with the seat surface along the guide surface at a second stroke depth that is greater than the first stroke depth of the at least one key cap, and wherein the haptic plate is configured to move along the guide surface while maintaining the gap with the guide surface at the second stroke depth.

4. The electronic device of claim 3, wherein the first haptic actuator is configured to not generate vibration after a determined time at the second stroke depth.

5. The electronic device of claim 3, wherein the first haptic actuator is configured to continuously generate vibration when a stroke depth is greater than or equal to the first stroke depth.

6. The electronic device of claim 1, further comprising:

a second haptic actuator configured vibrate the haptic plate and configured to generate vibration at a magnitude that is different from a magnitude of vibration of the first haptic actuator when the at least one key is stroked.

7. The electronic device of claim 6, wherein the first haptic actuator and the second haptic actuator are configured to be driven simultaneously or at different times.

8. The electronic device of claim 6, wherein the first haptic actuator and the second haptic actuator are arranged in a direction that is substantially parallel with an edge of the housing, and/or wherein the first haptic actuator and the second haptic actuator are arranged in a direction that intersects an edge of the housing.

9. The electronic device of claim 1, further comprising:

a base plate disposed in the housing and configured to support the plurality of keys, and foam disposed between at least the base plate and the haptic plate along an edge of the base plate.

10. The electronic device of claim 1, further comprising:

a base plate disposed in the housing and configured to support the plurality of keys, and foam disposed in an inner area of the base plate and disposed between at least the base plate and the haptic plate.

11. The electronic device of claim 1, wherein the first haptic actuator is configured to:

generate vibration at a first magnitude on a first key of the plurality of keys spaced apart from the first haptic actuator by a first distance and generate vibration at a second magnitude that is different from the first magnitude on a second key of the plurality of keys spaced apart from the first haptic actuator by a second distance that is different from the first distance.

12. The electronic device of claim 1, further comprising:

at least one processor, comprising processing circuitry, configured to drive the first haptic actuator when at least one key of the plurality of keys is stroked.

13. The electronic device of claim 12, wherein the at least one processor is configured to generate a plurality of haptic output signals to drive the first haptic actuator by combining a plurality of trigger signals generated when the at least one key of the plurality of keys is stroked.

14. The electronic device of claim 12, wherein the plurality of keys comprises at least one first type key and at least one second type key, wherein the at least one processor is configured not to drive the first haptic actuator when the at least one first type key is stroked and is configured to drive the first haptic actuator when the at least one first type key is stroked and the at least one second type key is stroked, and/or wherein the at least one processor is configured to drive the first haptic actuator when the at least one first type key is stroked and is configured to drive the first haptic actuator when the at least one second type key is stroked.

15. The electronic device of claim 12, further comprising:

an application configured to recognize an input of a user, wherein the at least one processor is configured to drive the first haptic actuator when an input of the user that deviates from a determined input system is recognized in the application.

16. The electronic device of claim 1, further comprising:

a second haptic actuator configured vibrate the haptic plate and configured to generate vibration at a magnitude that is different from a magnitude of vibration of the first haptic actuator when the at least one key is stroked, and wherein the first haptic actuator and the second haptic actuator are configured to be driven sequentially when the stroke is applied to the base part.

17. The electronic device of claim 16, wherein the first haptic actuator and the second haptic actuator are arranged in a direction that is substantially parallel with an edge of the housing, and the first haptic actuator and the second haptic actuator are arranged in a direction that intersects an edge of the housing.

18. The electronic device of claim 1, wherein a top surface of the base part is parallel to the seat surface, and the seat surface extends from the guide surface in a direction perpendicular to the guide surface.

* * * * *